United States Patent

Suzuki

[11] Patent Number: 5,132,845
[45] Date of Patent: Jul. 21, 1992

[54] HIGH MANGIFICATION OBJECTIVE LENS SYSTEM

[75] Inventor: Toshinobu Suzuki, Tokyo, Japan

[73] Assignee: Olympus Optical Co., Ltd., Tokyo, Japan

[21] Appl. No.: 726,224

[22] Filed: Jul. 5, 1991

[30] Foreign Application Priority Data

Jul. 6, 1990 [JP] Japan .................. 2-177532

[51] Int. Cl.$^5$ .......................... G02B 21/02; G02B 9/64
[52] U.S. Cl. ........................................ 359/656; 359/754
[58] Field of Search ................ 350/414, 463; 359/656, 359/754

[56] References Cited

FOREIGN PATENT DOCUMENTS 60-209715 10/1985 Japan .
0241009 11/1985 Japan ................................. 350/414

Primary Examiner—Scott J. Sugarman
Attorney, Agent, or Firm—Cushman, Darby & Cushman

[57] ABSTRACT

A high magnification objective lens system comprising, in the order from the object side, a first positive lens unit which comprises a positive meniscus lens component having a concave surface on the object side and a plurality of positive cemented lens components, and has a function to converge a light bundle coming from an object, a second negative lens unit which comprises a negative lens component having a concave surface on the object side, a third lens unit which comprises a positive cemented lens component and has a positive refractive power, and a fourth lens unit which has a negative refractive power. This objective lens system has magnification on the order of 250× and a long working distance, and is of the apochromatic grade.

9 Claims, 4 Drawing Sheets

HIGH MAGNIFICATION OBJECTIVE LENS SYSTEM

BACKGROUND OF THE INVENTION a) Field of the invention

The present invention relates to a super-high magnification apochromatic objective lens system which has a long working distance and is to be used for inspections, etc. of IC wafers.

b) Description of the prior art

It is generally considered that the optimum magnification of a microscope as a whole lies at a level 500 to 1,000 times as high as the numerical aperture of the objective lens system used in the microscope, and the level exceeding the optimum magnification is called ineffective magnification. In order to enhance magnification of a microscope, it is therefore necessary to enlarge the numerical aperture of the objective lens system to be used therein. Though the liquid immersion type objective lens systems can have numerical apertures of 1.0 and higher, it is improper to use this type of objective lens systems in microscopes to be used for inspection of IC wafer and the objective lens systems for this application cannot have numerical apertures of 1.0 or higher.

In case of an objective lens system having a numerical aperture of 0.9, the optimum magnification of the microscope using this objective lens system lies at 450 to 900×. When the objective lens system has a magnification of 250× and the eyepiece lens system to be used in combination with it is designed for a magnification of 10×, the microscope has a magnification of 2500×, which is ineffective.

The description given above applies to a case where images formed by the microscope are to be observed by naked eyes. In these days, images formed by microscopes are observed not only by naked eyes but also on TV monitors and subjected to analysis. When sensitivities and resolving powers of the appliance used in conjunction with monitoring on TV and image analysis are taken into consideration, there remains a margin to allow the above-described limination imposed on the numerical aperture to be exceeded, and it is now strongly demanded to enhance magnifications of objective lens systems. Especially under the present circumstance where patterns on IC's and LSI's are becoming finer year by year, objective lens systems having high optical performance are required for inspecting highly integrated wafers.

Especially in the recent days, demands are further strengthened for objective lens systems which have super-high magnifications, apochromatic optical performance and long working distances. When objective lens systems have enhanced magnifications, however, their focal lengths are shortened, whereby chromatic aberration is aggravated and can hardly corrected in the objective lens systems. When working distances of objective lens systems are prolonged, on the other hand, it becomes very difficult to correct spherical aberration, curvature of field, coma, chromatic aberration, etc. in the objective lens systems.

As an objective lens system which has a relatively high magnification, there is known the lens system disclosed by Japanese Patent Kokai Publication No. Sho 60-209715. This objective lens system has a magnification of 150 to 200× and a mechanical working distance of 0.2 to 0.3 mm.

This conventional objective lens system has a working distance which is not long sufficiently and may allow collision against wafers.

SUMMARY OF THE INVENTION

A primary object of the present invention is to provide a super-high magnification objective lens system which allows to observe enlarged images of fine parts of wafers at a high magnification and is free from possibility of collision against wafers.

Another object of the present invention is to provide an apochromatic objective lens system which has a magnification on the order of 250× and a mechanical working distance on the order of 0.8 mm.

The high magnification objective lens system according to the present invention comprises, in the order from the object side, a first lens unit which comprises a positive meniscus lens component having a concave surface on the object side and a plurality of positive cemented lens components, and has a positive refractive power as a whole, a second lens unit which comprises a negative lens component having a concave surface on the object side and has a negative refractive power as a whole, a third lens unit which comprises a positive cemented lens component and has a positive refractive power as a whole, and a fourth lens unit which has a negative refractive power. Out of these lens units mentioned above, the first lens unit has a function to change a light bundle coming from an object into a converging light bundle. The second lens unit has a function to correct the negative spherical aberration, curvature of field, coma, etc. which are not corrected sufficiently by the first lens unit. The third lens unit has a function to relay an image formed by the first lens unit and the second lens unit, whereas the fourth lens unit has a function to impart a high magnification to the objective lens system with the strong negative refractive power thereof. Further, the fourth lens unit has an additional function to correct the negative spherical aberration, curvature of field, coma, etc. with good balance in the objective lens system as a whole.

Furthermore, the negative spherical aberration, curvature of field, coma, etc. can be corrected very favorably in the objective lens system as a whole by arranging a negative lens component having a concave surface on the object side in the fourth lens unit. Since the objective lens system according to the present invention has the super-high magnification, it has a very narrow numerical aperture on the side of emergence and a converging light bundle is incident on the fourth lens unit. When a lens component having a strongly negative power is to be arranged in the optical path of this converging light bundle, it is therefore advantageous for correction of aberrations to arrange the negative lens component having a concave surface on the object side in the fourth lens unit.

In order to accomplish the objects of the present invention, it is more desirable that the objective lens system having the composition described above is designed so as to satisfy the conditions (1), (2) and (3) mentioned below:

$$1 < d_1/f < 4.5 \quad (1)$$

$$-0.1 < f/f_2 < -0.01 \quad (2)$$

$$-0.7 < f/f_4 < -0.1 \quad (3)$$

wherein the reference symbol f represents the focal length of the objective lens system as a whole, the reference symbols $f_2$ and $f_4$ designate the focal lengths of the second lens unit and the fourth lens units respectively, and the reference symbol $d_1$ denotes the thickness of the center of the positive meniscus lens component arranged on the object side in the first lens unit.

The condition (1) is required for obtaining good balance between the prolonging of the working distance of the objective lens system and the favorable correction of aberrations.

If the upper limit of the condition (1) is exceeded, the center of the positive meniscus lens component arranged on the object side in the first lens unit is too thick, thereby making it difficult to prolong the working distance of the objective lens system. In other words, an attempt to prolong the working distance of the objective lens system will aggravate aberrations, especially the longitudinal chromatic aberration, in the first lens unit, which can hardly be corrected by the other lens units. For this reason, it is necessary to design the objective lens system so as not to allow the upper limit of the condition (1) to be exceeded in order to obtain an apochromatic objective lens system which has a long working distance. If the lower limit of the condition (1) is exceeded, in contrast, the center of the above-mentioned positive meniscus lens component will be too thin, thereby making it impossible to maintain the numerical aperture required for the objective lens system and the thicknesses required for the lens components.

The condition (2) is adopted for favorably correcting the spherical aberration, curvature of field, coma, etc. in the objective lens system.

Arranged in the first lens unit are the plurality of cemented lens components as described above. The aberrations mentioned above can be corrected by using a cemented lens component having a negative refractive power as one of these cemented lens components. However, it is difficult to sufficiently correct the negative spherical aberration, curvature of field, coma, etc. produced in the first lens unit simply by using the cemented lens component having the negative refractive power. In order to correct these aberrations, it is effective to utilize the negative refractive power of the second lens unit.

If the upper limit of the condition (2) is exceeded, the second lens unit will have a weak negative refractive power and lose the aberration correcting function thereof. If the lower limit of the condition (2) is exceeded, the second lens unit will have too strong a negative refractive power, and produce positive spherical aberration, curvature of field and coma.

The condition (3) defines the refractive power of the fourth lens unit which is required for maintaining the long working distance and obtaining a high magnification of the objective lens system. Further, the condition (3) is required for correcting curvature of field and astigmatism by correcting the Petzval's sum of the objective lens system as a whole and also for correcting the negative spherical aberration produced by the positive refractive power of the third lens unit.

If the upper limit of the condition (3) is exceeded, the negative refractive power of the fourth lens unit will be weakened, thereby making it difficult to obtain the super-high magnification while maintaining the long working distance of the objective lens system and making it impossible to correct the aberrations sufficiently. If the lower limit of the condition (3) is exceeded, the negative refractive power of the fourth lens unit will be too strong, thereby making it impossible to properly balance the aberrations.

DETAILED DESCRIPTION OF THE PREFERRED EMBODIMENTS

Figure 1:
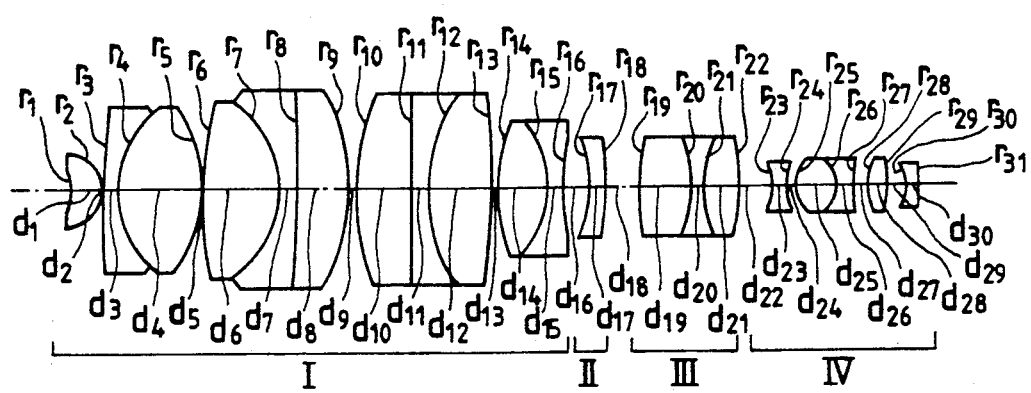
FIG. 1 through FIG. 4 show sectional views illustrating compositions of Embodiments 1 through 4 respectively of the objective lens system according to the present invention.

Now, the objective lens system according to the present invention will be described more detailedly below with reference to the preferred embodiments illustrated in the accompanying drawings and given in the form of the following numerical data:

| Embodiment 1 | | | |
|---|---|---|---|
| f = 0.72, | NA = 0.9, | magnification 250 | WD = 0.9 |
| $r_1 = -2.7308$ | $d_1 = 1.6000$ | $n_1 = 1.67790$ | $\nu_1 = 55.33$ |
| $r_2 = -1.9814$ | $d_2 = 0.1000$ | | |
| $r_3 = 78.3681$ | $d_3 = 0.7000$ | $n_2 = 1.61340$ | $\nu_2 = 43.84$ |
| $r_4 = 5.7609$ | $d_4 = 4.5000$ | $n_3 = 1.61800$ | $\nu_3 = 63.38$ |
| $r_5 = -7.5497$ | $d_5 = 0.1000$ | | |
| $r_6 = 23.6186$ | $d_6 = 4.0000$ | $n_4 = 1.43875$ | $\nu_4 = 94.97$ |
| $r_7 = -5.8684$ | $d_7 = 1.0000$ | $n_5 = 1.61340$ | $\nu_5 = 43.84$ |
| $r_8 = -87.4608$ | $d_8 = 2.7060$ | $n_6 = 1.56907$ | $\nu_6 = 71.30$ |
| $r_9 = -10.6993$ | $d_9 = 0.3796$ | | |
| $r_{10} = 13.2265$ | $d_{10} = 3.1093$ | $n_7 = 1.56907$ | $\nu_7 = 71.30$ |
| $r_{11} = 3508.1877$ | $d_{11} = 1.0000$ | $n_8 = 1.71850$ | $\nu_8 = 33.52$ |
| $r_{12} = 9.3151$ | $d_{12} = 3.6000$ | $n_9 = 1.56907$ | $\nu_9 = 71.30$ |
| $r_{13} = -40.9012$ | $d_{13} = 0.1830$ | | |
| $r_{14} = 8.7831$ | $d_{14} = 2.8000$ | $n_{10} = 1.56907$ | $\nu_{10} = 71.30$ |
| $r_{15} = -5.4820$ | $d_{15} = 0.9000$ | $n_{11} = 1.74000$ | $\nu_{11} = 31.71$ |
| $r_{16} = 12.4038$ | $d_{16} = 1.3977$ | | |
| $r_{17} = -7.6484$ | $d_{17} = 0.9000$ | $n_{12} = 1.74000$ | $\nu_{12} = 31.71$ |
| $r_{18} = -20.8852$ | $d_{18} = 1.7432$ | | |
| $r_{19} = 10.6528$ | $d_{19} = 2.8591$ | $n_{13} = 1.80518$ | $\nu_{13} = 25.43$ |
| $r_{20} = -7.2184$ | $d_{20} = 0.7000$ | $n_{14} = 1.65160$ | $\nu_{14} = 58:52$ |
| $r_{21} = 6.9557$ | $d_{21} = 1.8000$ | $n_{15} = 1.80518$ | $\nu_{15} = 25.43$ |
| $r_{22} = -15.2990$ | $d_{22} = 1.7918$ | | |
| $r_{23} = -2.8945$ | $d_{23} = 0.8000$ | $n_{16} = 1.88300$ | $\nu_{16} = 40.78$ |
| $r_{24} = 3.9861$ | $d_{24} = 0.4263$ | | |
| $r_{25} = 2.3033$ | $d_{25} = 2.2000$ | $n_{17} = 1.56907$ | $\nu_{17} = 71.30$ |
| $r_{26} = -1.8339$ | $d_{26} = 0.9000$ | $n_{18} = 1.74000$ | $\nu_{18} = 31.71$ |
| $r_{27} = 7.5044$ | $d_{27} = 0.7040$ | | |
| $r_{28} = 3.6578$ | $d_{28} = 1.0000$ | $n_{19} = 1.80518$ | $\nu_{19} = 25.43$ |
| $r_{29} = -10.1279$ | $d_{29} = 1.0000$ | | |
| $r_{30} = -2.1497$ | $d_{30} = 0.7000$ | $n_{20} = 1.64450$ | $\nu_{20} = 40.82$ |
| $r_{31} = 46.3291$ | $d_1/f = 2.22$, | $f/f_2 = -0.043$, | $f/f_4 = -0.405$ |

| Embodiment 2 | | | |
|---|---|---|---|
| f = 0.72, | NA = 0.9, | magnification 250 | WD = 0.9 |
| $r_1 = -2.4339$ | $d_1 = 1.6759$ | $n_1 = 1.75500$ | $\nu_1 = 52.33$ |
| $r_2 = -1.9956$ | $d_2 = 0.1000$ | | |
| $r_3 = 11.9043$ | $d_3 = 0.7000$ | $n_2 = 1.61340$ | $\nu_2 = 43.84$ |
| $r_4 = 4.4754$ | $d_4 = 4.5200$ | $n_3 = 1.61800$ | $\nu_3 = 63.38$ |
| $r_5 = -10.0757$ | $d_5 = 0.1000$ | | |
| $r_6 = -49.2390$ | $d_6 = 4.7000$ | $n_4 = 1.43875$ | $\nu_4 = 94.97$ |
| $r_7 = -4.9232$ | $d_7 = 1.0500$ | $n_5 = 1.74000$ | $\nu_5 = 31.71$ |

-continued

Embodiment 2
f = 0.72, NA = 0.9, magnification 250 WD = 0.9

| | | | |
|---|---|---|---|
| $r_8 = \infty$ | $d_8 = 2.6000$ | $n_6 = 1.56907$ | $\nu_6 = 71.30$ |
| $r_9 = -10.4918$ | $d_9 = 0.1000$ | | |
| $r_{10} = 24.9602$ | $d_{10} = 2.5000$ | $n_7 = 1.56907$ | $\nu_7 = 71.30$ |
| $r_{11} = -22.9686$ | $d_{11} = 0.5000$ | | |
| $r_{12} = 12.3318$ | $d_{12} = 1.0000$ | $n_8 = 1.61340$ | $\nu_8 = 43.84$ |
| $r_{13} = 7.0061$ | $d_{13} = 3.6000$ | $n_9 = 1.43875$ | $\nu_9 = 94.97$ |
| $r_{14} = -52.6086$ | $d_{14} = 0.1000$ | | |
| $r_{15} = 7.3827$ | $d_{15} = 2.8000$ | $n_{10} = 1.56907$ | $\nu_{10} = 71.30$ |
| $r_{16} = 73.2428$ | $d_{16} = 0.9000$ | $n_{11} = 1.74000$ | $\nu_{11} = 31.71$ |
| $r_{17} = 5.7797$ | $d_{17} = 1.8000$ | | |
| $r_{18} = -4.3800$ | $d_{18} = 1.0000$ | $n_{12} = 1.74000$ | $\nu_{12} = 31.71$ |
| $r_{19} = -6.3929$ | $d_{19} = 4.2413$ | | |
| $r_{20} = 11.0011$ | $d_{20} = 2.0000$ | $n_{13} = 1.80518$ | $\nu_{13} = 25.43$ |
| $r_{21} = -5.1142$ | $d_{21} = 0.7000$ | $n_{14} = 1.69680$ | $\nu_{14} = 55.52$ |
| $r_{22} = 3.8832$ | $d_{22} = 1.8000$ | $n_{15} = 1.80518$ | $\nu_{15} = 25.43$ |
| $r_{23} = 43.9773$ | $d_{23} = 2.0129$ | | |
| $r_{24} = -2.9645$ | $d_{24} = 0.8000$ | $n_{16} = 1.88300$ | $\nu_{16} = 40.78$ |
| $r_{25} = 10.5477$ | $d_{25} = 0.2000$ | | |
| $r_{26} = 2.6413$ | $d_{26} = 2.2000$ | $n_{17} = 1.56907$ | $\nu_{17} = 71.30$ |
| $r_{27} = -2.0084$ | $d_{27} = 1.0000$ | $n_{18} = 1.74000$ | $\nu_{18} = 31.71$ |
| $r_{28} = 5.7289$ | $d_1/f = 2.33$, | $f/f_2 = -0.03$, | $f/f_4 = -0.32$ |

Embodiment 3
f = 0.72, NA = 0.9, magnification 250 WD = 0.6744

| | | | |
|---|---|---|---|
| $r_1 = -3.2931$ | $d_1 = 2.7000$ | $n_1 = 1.67790$ | $\nu_1 = 55.33$ |
| $r_2 = -2.6043$ | $d_2 = 0.1000$ | | |
| $r_3 = 22.4188$ | $d_3 = 0.7000$ | $n_2 = 1.61340$ | $\nu_2 = 43.84$ |
| $r_4 = 5.5305$ | $d_4 = 4.5000$ | $n_3 = 1.61800$ | $\nu_3 = 63.38$ |
| $r_5 = -8.2617$ | $d_5 = 0.0500$ | | |
| $r_6 = 21.4182$ | $d_6 = 4.4000$ | $n_4 = 1.43875$ | $\nu_4 = 94.97$ |
| $r_7 = -5.4308$ | $d_7 = 1.0000$ | $n_5 = 1.61340$ | $\nu_5 = 43.84$ |
| $r_8 = 10.2836$ | $d_8 = 3.0000$ | $n_6 = 1.56907$ | $\nu_6 = 71.30$ |
| $r_9 = -14.2077$ | $d_9 = 0.1000$ | | |
| $r_{10} = 11.4193$ | $d_{10} = 2.3000$ | $n_7 = 1.56907$ | $\nu_7 = 71.30$ |
| $r_{11} = \infty$ | $d_{11} = 1.0000$ | $n_8 = 1.71850$ | $\nu_8 = 33.52$ |
| $r_{12} = 13.6144$ | $d_{12} = 3.6000$ | $n_9 = 1.56907$ | $\nu_9 = 71.30$ |
| $r_{13} = -60.9076$ | $d_{13} = 0.0020$ | | |
| $r_{14} = 9.7501$ | $d_{14} = 2.8000$ | $n_{10} = 1.56907$ | $\nu_{10} = 71.30$ |
| $r_{15} = -9.7984$ | $d_{15} = 0.9000$ | $n_{11} = 1.74000$ | $\nu_{11} = 31.71$ |
| $r_{16} = 11.5932$ | $d_{16} = 1.3977$ | | |
| $r_{17} = -4.2571$ | $d_{17} = 0.9000$ | $n_{12} = 1.61340$ | $\nu_{12} = 43.84$ |
| $r_{18} = -7.7316$ | $d_{18} = 0.9411$ | | |
| $r_{19} = 5.6648$ | $d_{19} = 2.7000$ | $n_{13} = 1.61800$ | $\nu_{13} = 63.38$ |
| $r_{20} = 9.7428$ | $d_{20} = 0.8000$ | $n_{14} = 1.61340$ | $\nu_{14} = 43.84$ |
| $r_{21} = 3.6078$ | $d_{21} = 1.3000$ | | |
| $r_{22} = 11.5789$ | $d_{22} = 2.0000$ | $n_{15} = 1.80518$ | $\nu_{15} = 25.43$ |
| $r_{23} = -3.5099$ | $d_{23} = 0.7000$ | $n_{16} = 1.67790$ | $\nu_{16} = 55.33$ |
| $r_{24} = 3.3446$ | $d_{24} = 1.8000$ | $n_{17} = 1.80518$ | $\nu_{17} = 25.43$ |
| $r_{25} = -93.2491$ | $d_{25} = 2.0347$ | | |
| $r_{26} = -2.7181$ | $d_{26} = 0.8000$ | $n_{18} = 1.88300$ | $\nu_{18} = 40.78$ |
| $r_{27} = 9.5193$ | $d_{27} = 0.2000$ | | |
| $r_{28} = 2.8023$ | $d_{28} = 2.2000$ | $n_{19} = 1.56907$ | $\nu_{19} = 71.30$ |
| $r_{29} = -1.8357$ | $d_{29} = 1.0000$ | $n_{20} = 1.74000$ | $\nu_{20} = 31.71$ |
| $r_{30} = 26.2158$ | $d_1/f = 3.75$, | $f/f_2 = -0.004$, | $f/f_4 = -0.264$ |

Embodiment 4
f = 0.72, NA = 0.9, magnification 250 WD = 1.2558

| | | | |
|---|---|---|---|
| $r_1 = -3.2257$ | $d_1 = 1.7700$ | $n_1 = 1.67790$ | $\nu_1 = 55.33$ |
| $r_2 = -2.3460$ | $d_2 = 0.1000$ | | |
| $r_3 = -155.9060$ | $d_3 = 0.7000$ | $n_2 = 1.61340$ | $\nu_2 = 43.84$ |
| $r_4 = 6.8590$ | $d_4 = 4.5000$ | $n_3 = 1.61800$ | $\nu_3 = 63.38$ |
| $r_5 = -7.2177$ | $d_5 = 0.2000$ | | |
| $r_6 = 25.8366$ | $d_6 = 4.7000$ | $n_4 = 1.43875$ | $\nu_4 = 94.97$ |
| $r_7 = -6.1745$ | $d_7 = 1.0000$ | $n_5 = 1.61340$ | $\nu_5 = 43.84$ |
| $r_8 = -73.9886$ | $d_8 = 2.4000$ | $n_6 = 1.56907$ | $\nu_6 = 71.30$ |
| $r_9 = -14.0673$ | $d_9 = 0.1000$ | | |
| $r_{10} = 11.6822$ | $d_{10} = 3.1000$ | $n_7 = 1.56907$ | $\nu_7 = 71.30$ |
| $r_{11} = -63.6114$ | $d_{11} = 1.0000$ | $n_8 = 1.61340$ | $\nu_8 = 43.84$ |
| $r_{12} = 5.6572$ | $d_{12} = 3.6000$ | $n_9 = 1.56907$ | $\nu_9 = 71.30$ |
| $r_{13} = -100.4672$ | $d_{13} = 0.1893$ | | |
| $r_{14} = 6.0131$ | $d_{14} = 1.0000$ | $n_{10} = 1.74000$ | $\nu_{10} = 31.71$ |
| $r_{15} = 3.3142$ | $d_{15} = 4.9000$ | $n_{11} = 1.43875$ | $\nu_{11} = 94.97$ |

Embodiment 4 (continued)
f = 0.72, NA = 0.9, magnification 250 WD = 1.2558

| | | | |
|---|---|---|---|
| $r_{16} = -4.7566$ | $d_{16} = 0.9000$ | $n_{12} = 1.61340$ | $\nu_{12} = 43.84$ |
| $r_{17} = 9.1286$ | $d_{17} = 1.3977$ | | |
| $r_{18} = -5.2419$ | $d_{18} = 1.0621$ | $n_{13} = 1.61340$ | $\nu_{13} = 43.84$ |
| $r_{19} = -15.8567$ | $d_{19} = 1.4773$ | | |
| $r_{20} = -100.7177$ | $d_{20} = 2.1000$ | $n_{14} = 1.80518$ | $\nu_{14} = 25.43$ |
| $r_{21} = -3.2786$ | $d_{21} = 0.7000$ | $n_{15} = 1.67790$ | $\nu_{15} = 55.33$ |
| $r_{22} = 4.0858$ | $d_{22} = 1.8000$ | $n_{16} = 1.80518$ | $\nu_{16} = 25.43$ |
| $r_{23} = -9.1457$ | $d_{23} = 1.9000$ | | |
| $r_{24} = -2.5497$ | $d_{24} = 0.8000$ | $n_{17} = 1.88300$ | $\nu_{17} = 40.78$ |
| $r_{25} = -56.0085$ | $d_{25} = 0.1479$ | | |
| $r_{26} = 2.7556$ | $d_{26} = 2.2000$ | $n_{18} = 1.56907$ | $\nu_{18} = 71.30$ |
| $r_{27} = -2.3533$ | $d_{27} = 1.0000$ | $n_{19} = 1.74000$ | $\nu_{19} = 31.71$ |
| $r_{28} = 5.0651$ | $d_1/f = 2.46$, | $f/f_2 = -0.05$, | $f/f_4 = -0.276$ | wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements and the reference symbols $\nu_1, \nu_2, \ldots$ represent the Abbe's numbers of the respective lens elements.

The Embodiment 1 has the composition illustrated in FIG. 1, wherein the first lens unit I and the third lens unit III has positive refractive powers, whereas the second lens unit II and the fourth lens unit IV have negative refractive powers.

The first lens unit I has the function to change the light bundle coming from an object into a converging light bundle as already described above. Further, the second lens unit II has the function to correct the negative spherical aberration, curvature of field, coma, etc. which are not corrected sufficiently by the first lens unit I. Furthermore, the third lens unit III has the function to relay the image formed by the first lens unit and the second lens unit. In addition, the fourth lens unit has the function to correct the negative spherical aberration, curvature of field, coma, etc. with good balance in the objective lens system as a whole.

Figure 2:
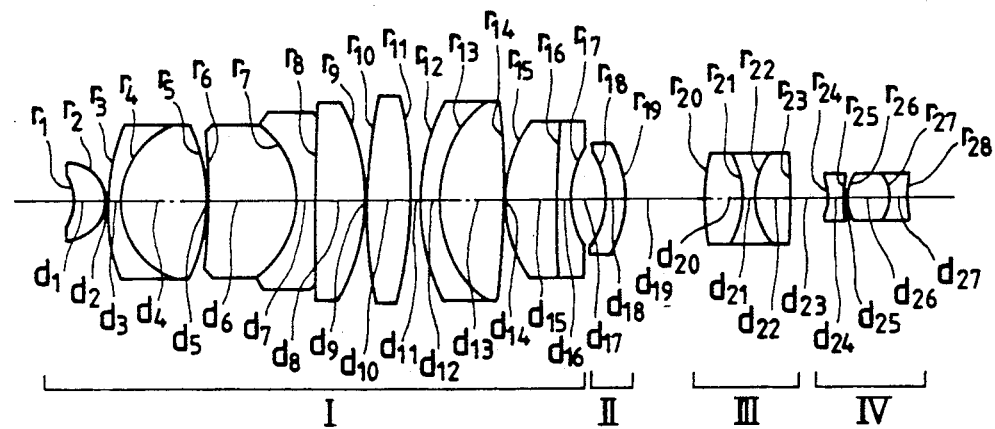
Figure 3:
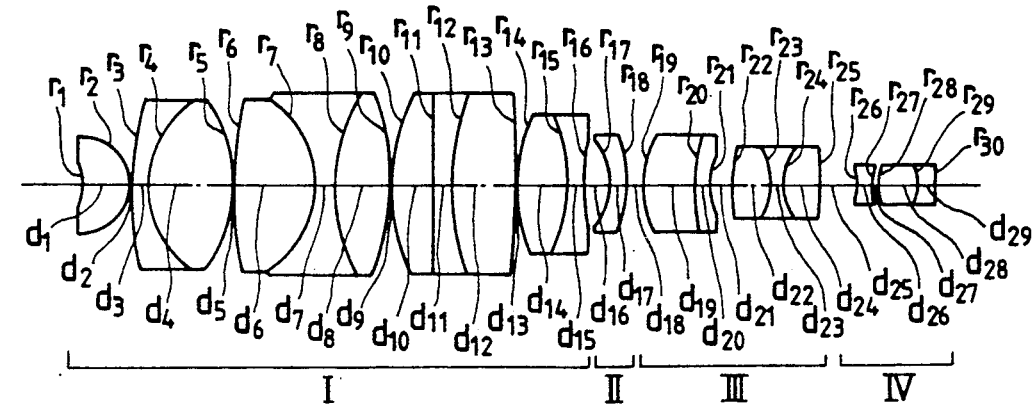
Figure 4:
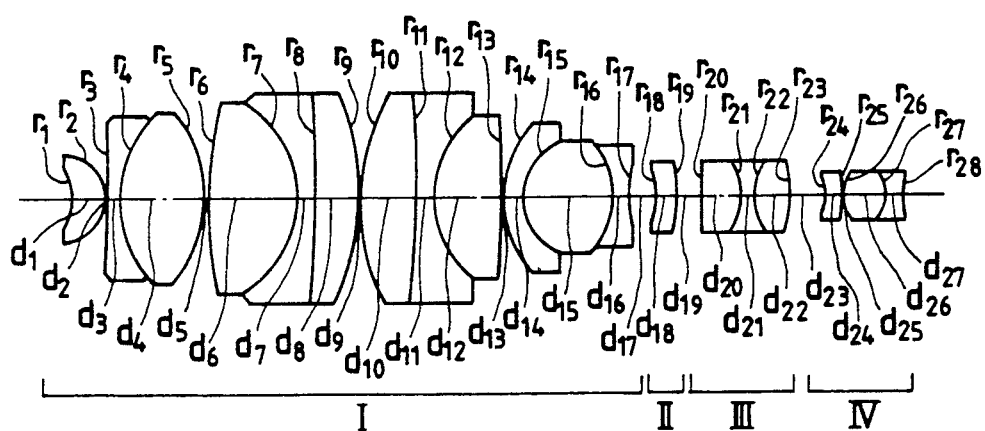

The Embodiments 2 through 4 have the compositions illustrated in FIG. 2 through FIG. 4 respectively, wherein each of the lens units has the function which is the same as that of the corresponding lens unit in the Embodiment 1.

Each of the Embodiments 1 through 4 is designed so as to form an image of object at inifinite distance. Accordingly, each of these Embodiments is to be used in combination with the imaging lens system which is exemplified by FIG. 9 and has the numerical data listed below:

| | | | |
|---|---|---|---|
| $r_1 = 27.3488$ | $d_1 = 3.7$ | $n_1 = 1.488$ | $\nu_1 = 70.2$ |
| $r_2 = -113.7214$ | $d_2 = 1.85$ | | |
| $r_3 = -53.2732$ | $d_3 = 1.85$ | $n_2 = 1.74$ | $\nu_2 = 28.3$ |
| $r_4 = -113.2444$ | $d_4 = 13.89$ | | |
| $r_5 = 40.7063$ | $d_5 = 1.67$ | $n_3 = 1.488$ | $\nu_3 = 70.2$ |
| $r_6 = 18.1992$ | | | |

Figure 9:
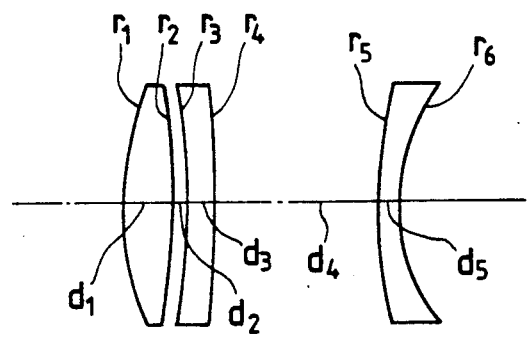
FIG. 9 shows a sectional view illustrating an example of the imaging lens system to be used in combination with the objective lens system according to the present invention.
Figure 5:
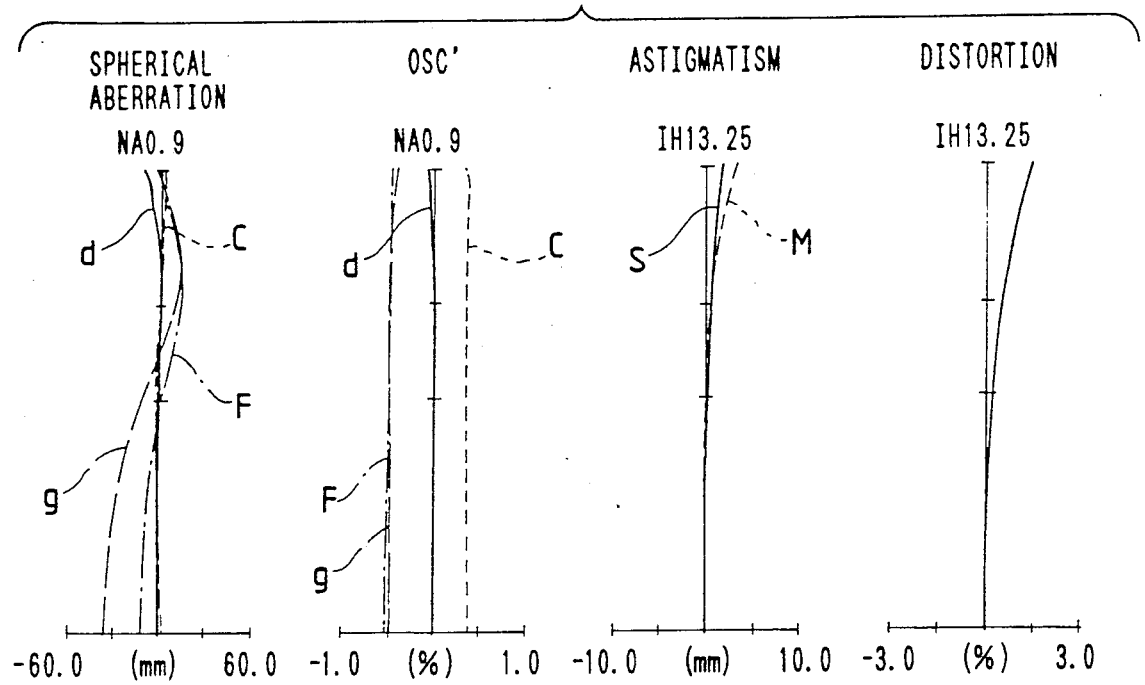
FIG. 5 through FIG. 8 show graphs illustrating aberration characteristics of the Embodiments 1 through 4 respectively of the present invention.
Figure 6:
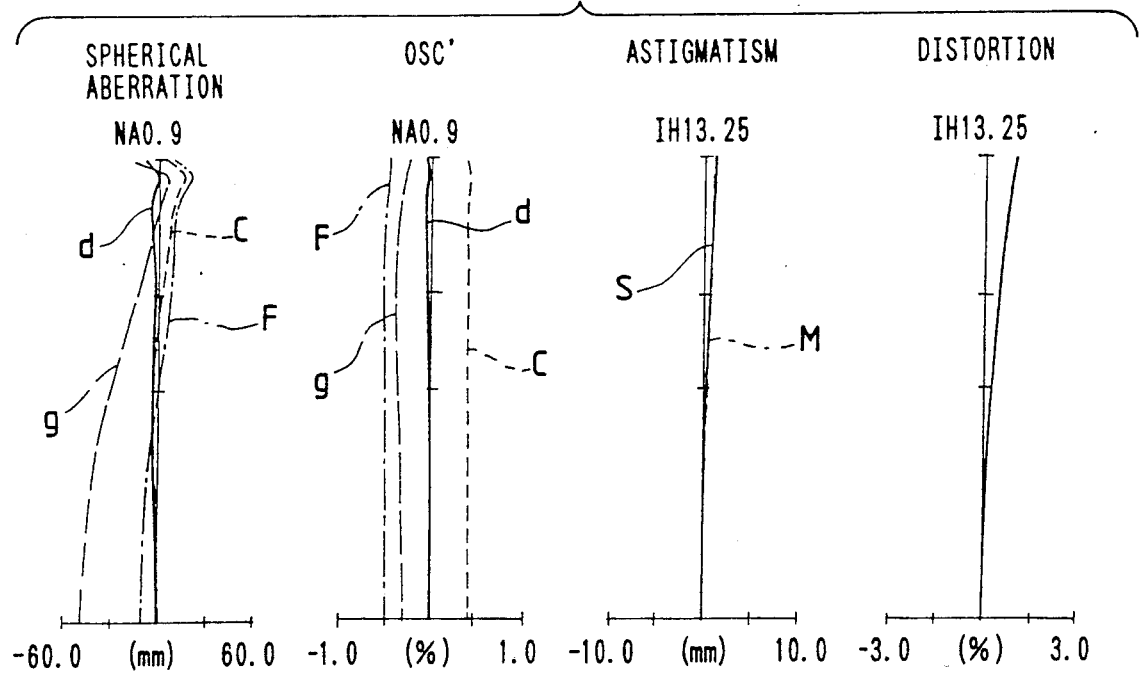
Figure 7:
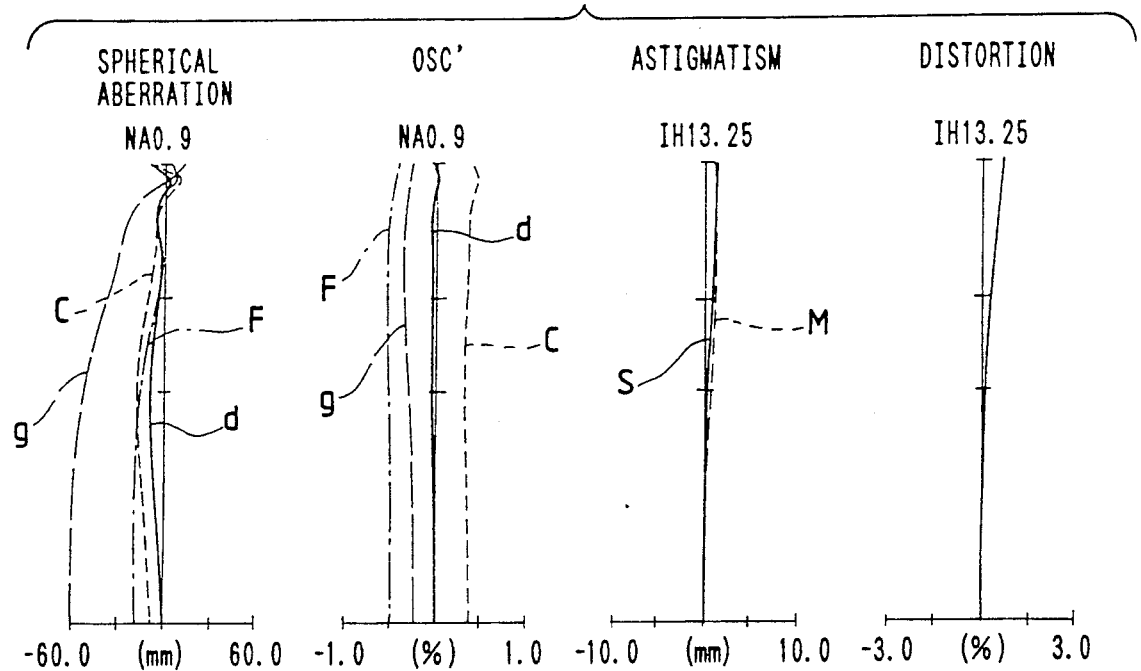
Figure 8:
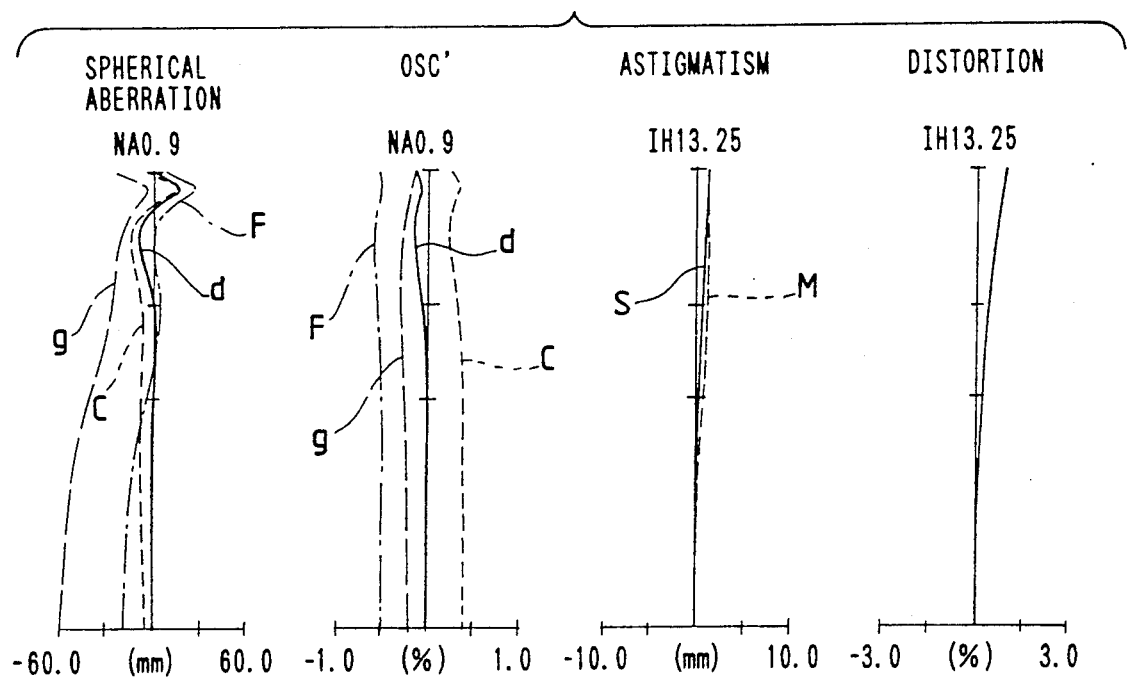

When combined with the imaging lens system illustrated in FIG. 9, the Embodiments 1 through 9 have the aberration characteristics visualized in FIG. 5 through FIG. 9 respectively.

As is understood from the foregoing description, the objective lens system according to the present invention is an apochromatic objective lens system which has a super-high magnification of 250×, a long mechanical working distance on the order of 0.4 to 0.8 mm, permits observation of enlarged images of fine patterns of wafers at the super-high magnification with little hazard of collision between the wafers and the objective lens system and features excellent optical performance assuring sufficiently corrected chromatic aberration.

I claim

1. A high magnification objective lens system comprising, in the order from the object side, a first lens unit comprising a positive meniscus lens component concave on the object side and a plurality of positive cemented lens components, and having a positive refractive power as a whole, a second lens unit comprising a negative lens component concave on the object side and having a negative refractive power as a whole, a third lens unit comprising a positive cemented lens component and having a positive refractive power as a whole, and a fourth lens unit having a negative refractive power as a whole.

2. A high magnification objective lens system according to claim 1 wherein said fourth lens unit comprises a negative lens component concave toward the object side.

3. A high magnification objective lens system according to claim 2 satisfying the conditions (1), (2) and (3) listed below:

$$1 < d_1/f < 4.5 \quad (1)$$

$$-0.1 < f/f_2 < -0.01 \quad (2)$$

$$-0.7 < f/f_4 < -0.1 \quad (3)$$

wherein the reference symbol f represents the focal length of the objective lens system as a whole, the reference symbols $f_2$ and $f_4$ designate the focal lengths of the second lens unit and the fourth lens unit respectively, and the reference symbol $d_1$ denotes the thickness of the center of the positive meniscus lens component arranged in the first lens unit.

4. A high magnification objective lens system according to claim 1 wherein the lens component arranged on the image side in the first lens unit and the lens component arranged on the object side in the second lens unit have concave surfaces opposed to each other.

5. A high magnification objective lens system according to claim 1 wherein the first lens unit comprises a cemented lens component consisting of positive, negative and positive lens elements.

6. A high magnification objective lens system according to claim 1 wherein the third lens unit comprises a cemented lens component consisting of positive, negative and positive lens elements.

7. A high magnification objective lens system according to claim 1 wherein the fourth lens unit comprises a cemented lens component.

8. A high magnification objective lens system comprising, in the order from the object side, a positive meniscus lens component concave on the object side, three cemented lens components, a pair of lens components having concave surfaces opposed to each other, a cemented lens component, a negative lens component concave on the object side and one or more lens components including a cemented lens component.

9. A high magnification objective lens system according to claim 8 wherein a positive lens component is arranged between any two of the first mentioned three cemented lens components.

* * * * *